United States Patent
Abe (10) Patent No.: US 8,279,294 B2
(45) Date of Patent: Oct. 2, 2012

(54) INFORMATION PROCESSING APPARATUS, REMOTE INDICATION SYSTEM, AND COMPUTER READABLE MEDIUM

(75) Inventor: Tsutomu Abe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 719 days.

(21) Appl. No.: 12/403,823

(22) Filed: Mar. 13, 2009

(65) Prior Publication Data

US 2010/0070846 A1    Mar. 18, 2010

(30) Foreign Application Priority Data

Sep. 15, 2008   (JP) ................................. 2008-235820

(51) Int. Cl.
*H04N 5/232* (2006.01)

(52) U.S. Cl. .................... 348/211.14; 348/552; 348/714

(58) Field of Classification Search .................. 348/552, 348/211.1, 211.12, 211.14, 714, 739; 725/105; 345/625; *H04N 5/232*
See application file for complete search history.

(56) References Cited

U.S. PATENT DOCUMENTS

| 6,035,323 A | * | 3/2000 | Narayen et al. ............... 709/201 |
| 7,333,135 B2 | * | 2/2008 | Foote et al. .............. 348/211.12 |
| 7,677,737 B2 | * | 3/2010 | Lonn ............................... 353/69 |
| 7,712,903 B2 | * | 5/2010 | Shingu .......................... 353/122 |
| 2004/0070674 A1 | | 4/2004 | Foote et al. |

FOREIGN PATENT DOCUMENTS

JP   2005-033756 A   2/2005

* cited by examiner

*Primary Examiner* — Trang U Tran
(74) *Attorney, Agent, or Firm* — Sughrue Mion, PLLC (57) ABSTRACT

An information processing apparatus including: a management portion that manages a first identifier to be added to a capture image from a capture device; and a first control portion that adds the first identifier to the capture image, temporarily stores the capture image to which the first identifier is added, and transmits the capture image to which the first identifier is added, to a remote terminal; wherein when storing an image displayed on a display device which is connected to the remote device is instructed, the management portion receives a storing instruction including the first identifier in relation to the displayed image from the remote terminal, acquires the capture image corresponding to the first identifier included in the storing instruction from the first control portion, and stores the acquired capture image into a storage.

7 Claims, 11 Drawing Sheets

IMAGE ID: a001

ANNOTATION ID: b001

IMAGE ID: a002

ANNOTATION ID: b002

IMAGE ID: a003

INFORMATION PROCESSING APPARATUS, REMOTE INDICATION SYSTEM, AND COMPUTER READABLE MEDIUM

CROSS-REFERENCE TO RELATED APPLICATION

This application is based on and claims priority under 35 USC 119 from Japanese Patent Application No. 2008-235820 filed Sep. 15, 2008.

BACKGROUND

1. Technical Field

This invention relates to an information processing apparatus, a remote indication system, and a computer readable medium.

2. Related Art

There has been conventionally known a remote indication system including a server (e.g. a computer) with which a video camera and a projector are connected, and a client (e.g. a computer) of a remote place connected with the server via a network.

SUMMARY

According to an aspect of the present invention, there is provided an information processing apparatus including: a management portion that manages a first identifier to be added to a capture image from a capture device; and a first control portion that adds the first identifier to the capture image, temporarily stores the capture image to which the first identifier is added, and transmits the capture image to which the first identifier is added, to a remote terminal; wherein when storing an image displayed on a display device which is connected to the remote device is instructed, the management portion receives a storing instruction including the first identifier in relation to the displayed image from the remote terminal, acquires the capture image corresponding to the first identifier included in the storing instruction from the first control portion, and stores the acquired capture image into a storage.

BRIEF DESCRIPTION OF THE DRAWINGS

Exemplary embodiments of the present invention will be described in detail based on the following figures, wherein.

DETAILED DESCRIPTION

A description will now be given, with reference to the accompanying drawings, of exemplary embodiments of the present invention.

Figure 1:
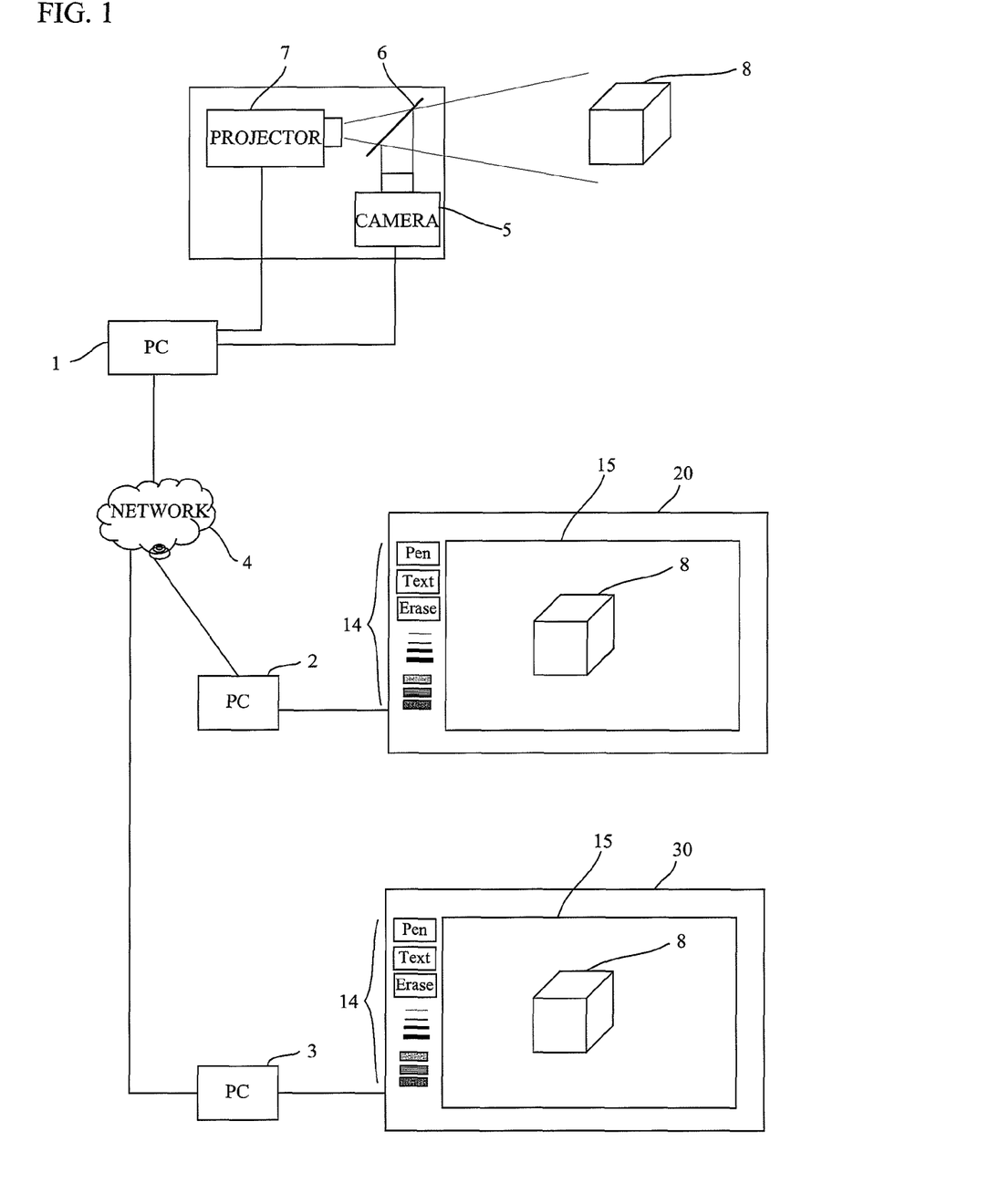
FIG. 1 is a block diagram showing the structure of a remote indication system in accordance with an exemplary embodiment of the present invention.

FIG. 1 is a block diagram showing the structure of a remote indication system in accordance with an exemplary embodiment of the present invention.

The remote indication system in FIG. 1 is provided with a personal computer (PC) 1 (an information processing apparatus) functioning as a server, and PCs 2 and 3 (remote terminals) functioning as clients. These elements are connected to each other via a network 4. A projector 7 (a projection device) and a camera 5 (a capture device) are connected to the PC 1.

Based on a control command from the PC 1, the projector 7 emits light beams or projects an annotation image input from the PC 2 or PC 3 onto an object 8 via a half mirror 6. It should be noted that the annotation image includes an image of any types such as a line, a character, a symbol, a figure, a color, and a font.

The camera 5 is composed of a video camera, captures a reflected image of the object 8 via the half mirror 6, and outputs the captured image to the PC 1. An angle of view and an optical axis of the camera 5 are identical with those of the projector 7. The camera 5 captures the object 8 as a still image at regular intervals (e.g. at time intervals of 0.1 seconds).

The PC 1 outputs the image captured with the camera 5 to the PCs 2 and 3 via the network 4. Display devices 20 and 30 are connected to the PCs 2 and 3, respectively, and display a display area 15 of the captured image and a user interface (UI) 14. It should be noted that the PCs 2 and 3 may be composed of all-in-one computers including the display devices 20 and 30, respectively.

The UI 14 includes a group of buttons such as a pen button, a text button, and an erase button, and icons defined by lines and colors. In FIG. 1, the captured image in which the camera 5 captures the object 8 is displayed on the two display areas 15. For example, when the pen button of the UI 14 is depressed and the annotation image is drawn on the object 8 in the display area 15, information on the annotation image (specifically, coordinate data) is output from the PC 2 to the PC 1. The PC 1 decodes the information on the annotation image, converts the information into a projection image for the projector 7, and outputs the converted projection image to the projector 7. The projector 7 projects the projection image onto the object 8.

Each of the PCs 2 and 3 outputs a control command to the PC 1, so that each of the PCs 2 and 3 can control operations of the projector 7 and the camera 5 (such as a capture angle of the camera 5, brightness of images captured with the camera 5, and brightness of images projected with the projector 7).

In FIG. 1, the PCs 2 and 3 are drawn as the clients, but the remote indication system may include three or more clients.

Figure 2:
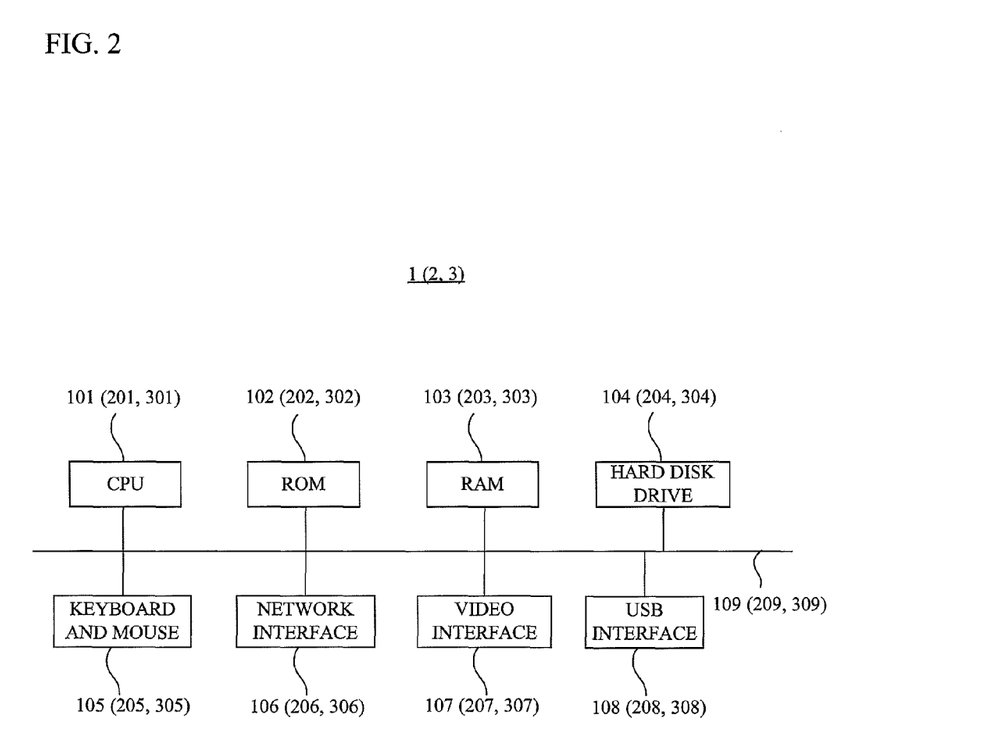
FIG. 2 is a block diagram showing the hardware structure of each of PCs 1 to 3.

FIG. 2 is a block diagram showing the hardware structure of each of PCs 1 to 3. Since the hardware structure of the PC 1 is the same as those of the PCs 2 and 3, a description will now be given of the hardware structure of the PC 1 hereinafter. It should be noted that, in FIG. 2, the reference numerals 201 to 209 designate the elements of the PC 2, and the reference numerals 301 to 309 designate the elements of the PC 3.

The PC 1 includes: a CPU 101 that controls the entire PC 1; a ROM 102 that stores control programs; a RAM 103 that functions a working area; a hard disk drive (HDD) 104 that stores various information and programs; a mouse and keyboard 105; a network interface 106 that is connected to other computers; a video interface 107 that is connected to the display device; and a USB (Universal Serial Bus) interface 108 that is connected to a USB device, not shown. The CPU 101 is connected to the ROM 102, the RAM 103, the HDD 104, the mouse and keyboard 105, the network interface 106, the video interface 107 and the USB interface 108 via a system bus 109. It should be noted that a CPU 201 or a CPU 301 corresponds to a remote control portion.

Figure 3:
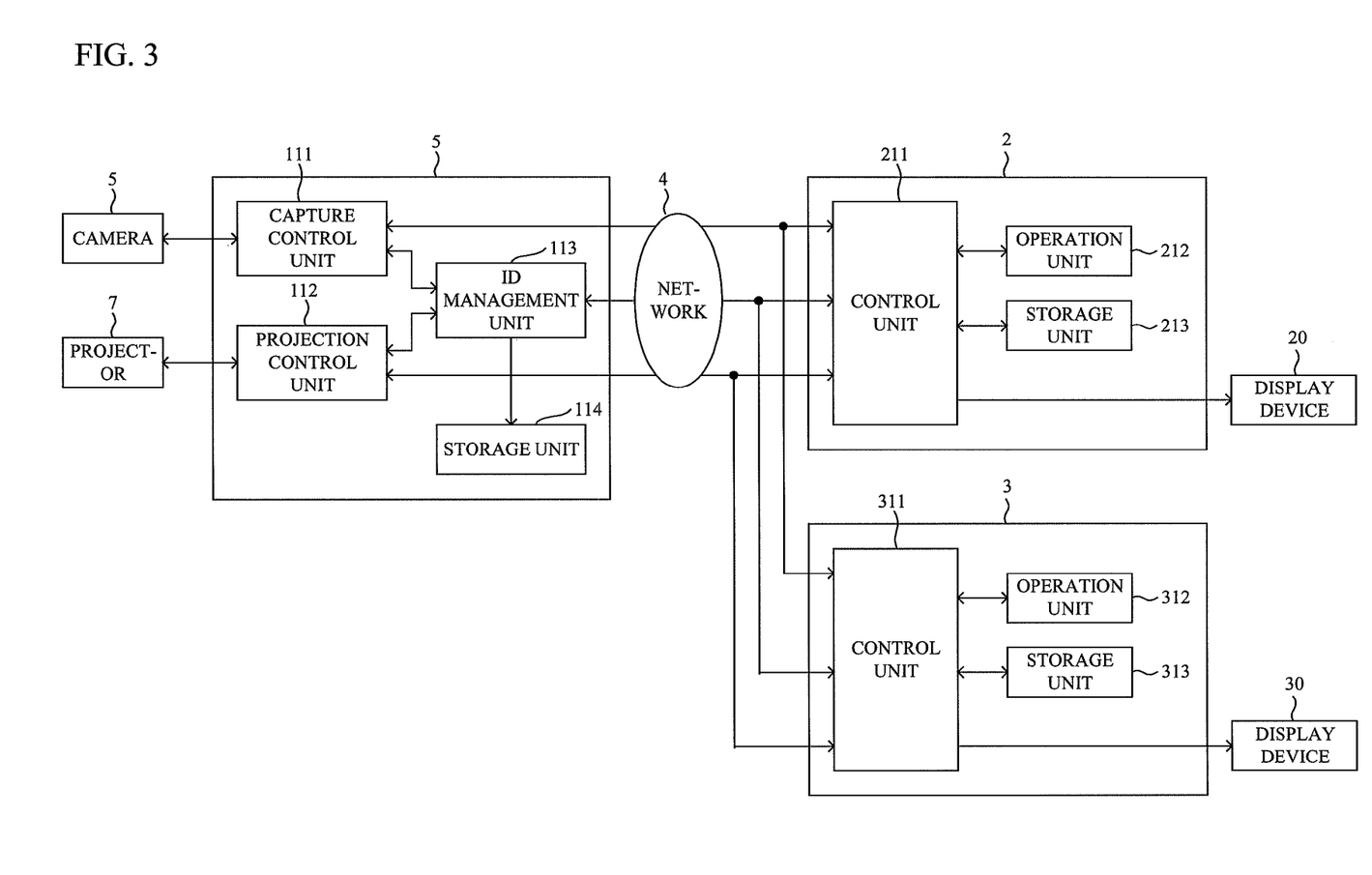
FIG. 3 is a functional block diagram of the remote indication system in FIG. 1.

FIG. 3 is a functional block diagram of the remote indication system in FIG. 1.

The PC 1 includes a capture control unit 111 (a first control portion), a projection control unit 112 (a second control portion), an ID management unit 113 (a management portion), and a storage unit 114. The capture control unit 111, the projection control unit 112, and the ID management unit 113 correspond to the CPU 101 executing various processes according to the control programs, and the storage unit 114 corresponds to the HDD 104.

The PCs 2 and 3 include control units 211 and 311 (remote control portions), operation units 212 and 312, and storage units 213 and 313, respectively. The control units 211 and 311 correspond to the CPUs 201 and 301, respectively. The operation units 212 and 312 correspond to sets of mouse and keyboard 205 and 305, respectively. The storage units 213 and 313 correspond to HDDs 204 and 304, respectively.

The capture control unit 111 acquires the capture image from the camera 5, and controls the operation of the camera 5. Also, the capture control unit 111 adds an image ID (a first identifier) issued by the projection control unit 112 to the capture image acquired from the camera 5, temporarily stores the capture image with the image ID, and outputs the capture image with the image ID to the PCs 2 and 3.

The projection control unit 112 adds an annotation ID (a second identifier) issued by the ID management unit 113 to the annotation image input from the PC 2 or PC 3, converts the annotation image with the annotation ID into the projection image for the projector 7, and outputs the projection image to the projector 7. The projection control unit 112 controls the operation of the projector 7, and temporarily stores the annotation image with the annotation ID. Further, the projection control unit 112 returns the annotation ID added to the annotation image to the client (e.g. the PC 2 or PC 3) which has written the annotation image.

In addition, when the annotation image is input from the PC 3, the projection control unit 112 adds the annotation ID to the annotation image, and outputs the annotation image with the annotation ID to the PC 2 (i.e., other client).

The ID management unit 113 manages the image ID to be added to the capture image and the annotation ID to be added to the annotation image, and issues the image ID to the capture control unit 111 depending on a request of the image ID from the capture control unit 111, and the annotation ID to the projection control unit 112 depending on a request of the annotation ID from the projection control unit 112.

Figure 4:
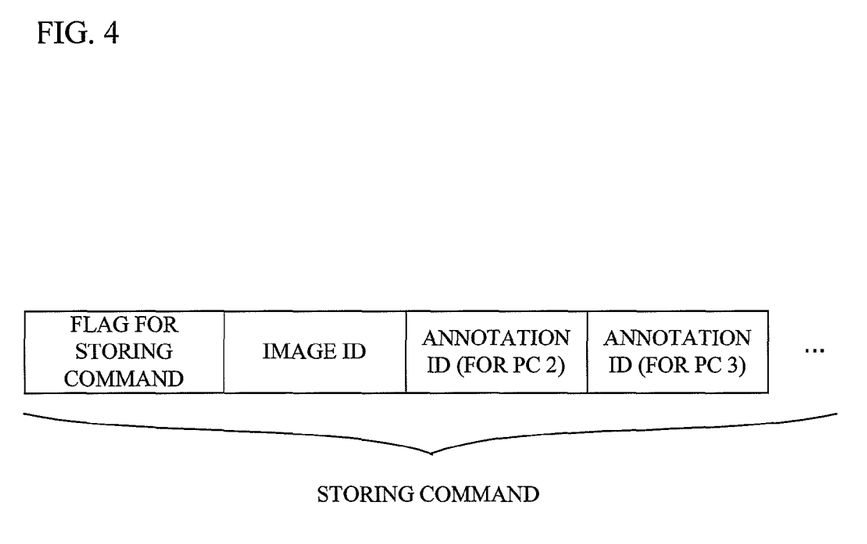
FIG. 4 is a diagram showing an example of a storing command.

When the ID management unit 113 receives a storing command of a displayed image from the PC 2 or PC 3 (here, the image ID and the annotation ID are added to the storing command), the ID management unit 113 acquires the capture image temporarily stored into the capture control unit 111 based on the image ID added to the storing command, and the annotation image temporarily stored into the projection control unit 112 based on the annotation ID added to the storing command. Then, the ID management unit 113 stores the acquired capture image and the acquired annotation image into the storage unit 114. FIG. 4 shows an example of the storing command.

Figure 5A:
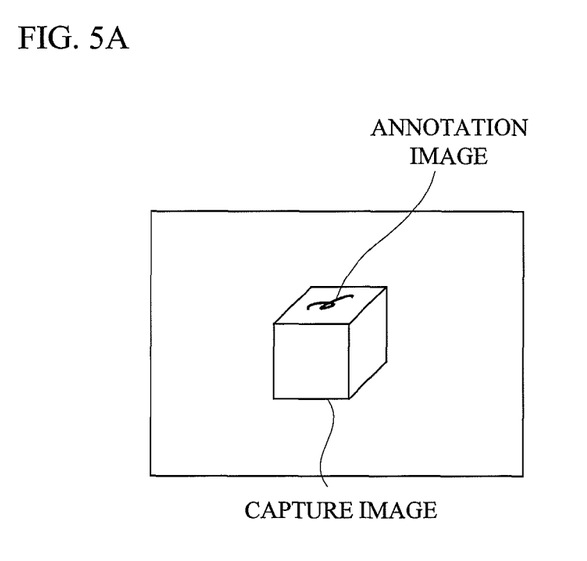
FIG. 5A is a diagram showing an example in which a captured image and an annotation image are stored as single screen data.
Figure 5B:
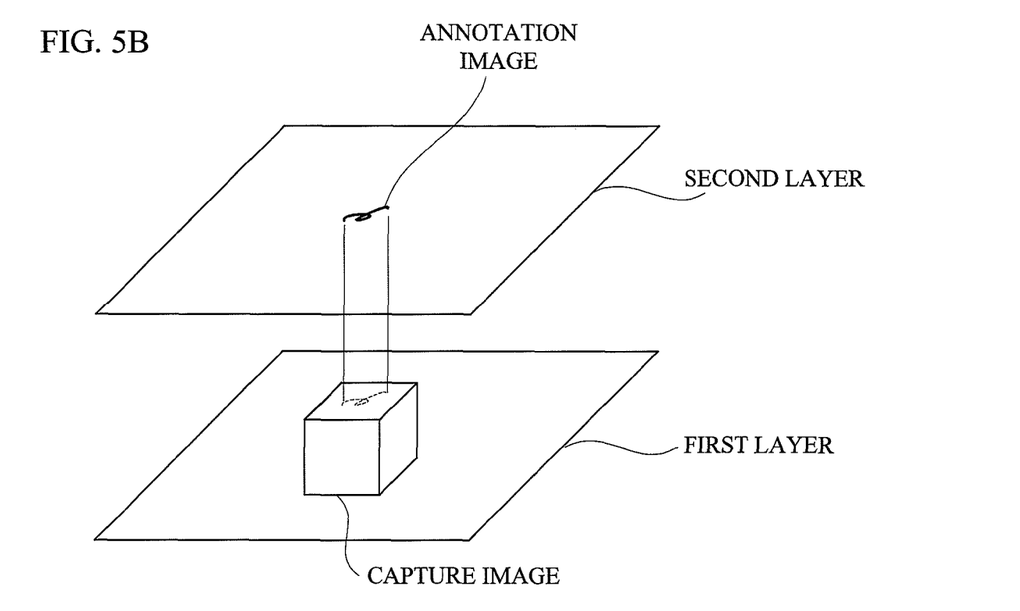
FIG. 5B is a diagram showing an example in which the captured image and the annotation image are associated with each other and are separately stored.

The storage unit 114 may store the capture image and the annotation image as single screen data (see FIG. 5A), or nay associate the capture image and the annotation image with each other and separately store the capture image and the annotation image (see FIG. 5B). The capture image in FIG. 5B is included in a first layer, and the annotation image in FIG. 5B is included in a second layer. When there is a plurality of annotation images, the annotation images are included in the second layer. It should be noted that, to the capture image and the annotation image stored into the storage unit 114, a corresponding image ID and a corresponding annotation ID are added, respectively.

The control unit 211 acquires the capture image with the image ID from the capture control unit 111, and causes the display device 20 to display the capture image with the image ID, the annotation image input from the operation unit 212, and the annotation image with the annotation ID, which is input from other client (e.g. the PC 3). It should be noted that the annotation ID of the annotation image input from the operation unit 212 is acquired from the projection control unit 112.

When a storing instruction is input from the operation unit 212, the control unit 211 generates the storing command including the image ID and the annotation ID which are added to the capture image and the annotation image displayed on the display device 20, and outputs the storing command to the ID management unit 113.

The operation unit 212 is used to input the annotation image and the storing instruction. The storage unit 213 stores various information and programs. It should be noted that the storage unit 213 may store the capture image with the image ID acquired by the control unit 211.

The functions of the control unit 311, the operation unit 312, and the storage unit 313 are the same as those of the control unit 211, the operation unit 212, and the storage unit 213, respectively, and hence description thereof is omitted.

Figure 6A:
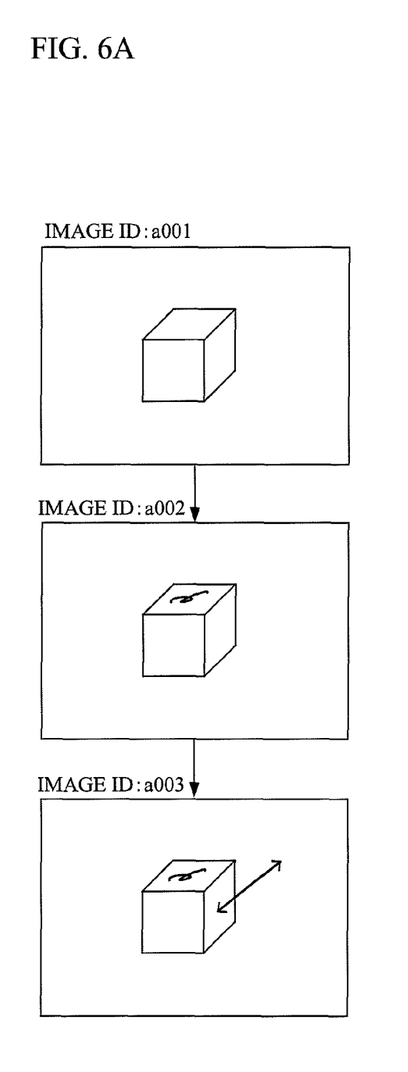
FIG. 6A is a diagram showing an example of the captured image with an image ID, which is temporarily stored into a capture control unit 111.
Figure 6B:
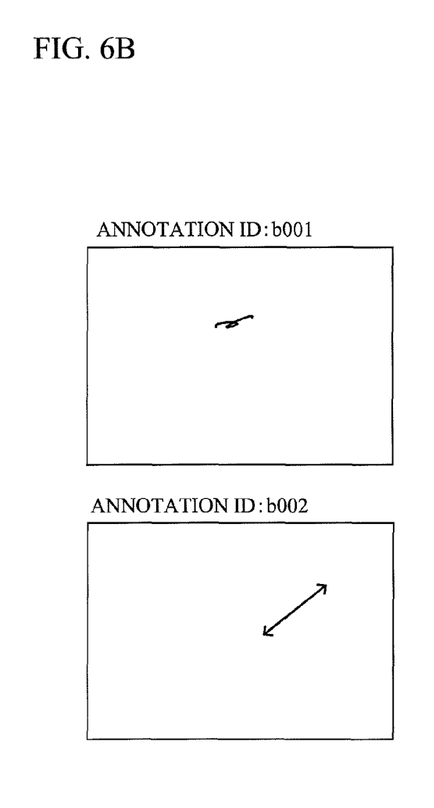
FIG. 6B is a diagram showing an example of the annotation image with an annotation ID, which is temporarily stored into a projection control unit 112.
Figure 7A:
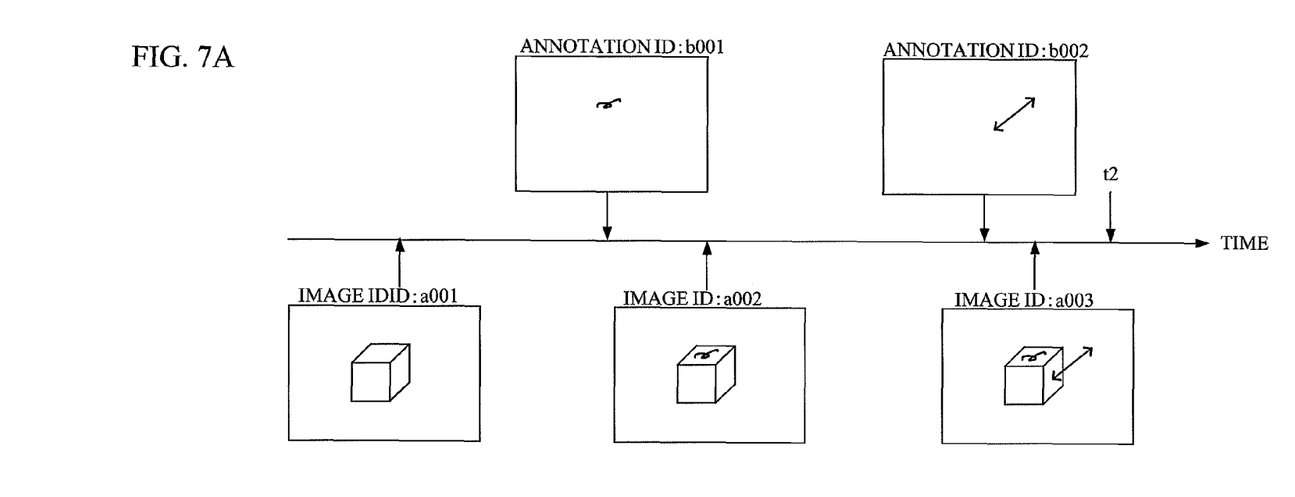
FIG. 7A is a diagram showing timing in which the captured image with the image ID and the annotation image with the annotation ID are temporarily stored.

FIG. 6A is a diagram showing an example of the captured image with the image ID, which is temporarily stored into the capture control unit 111, and FIG. 6B is a diagram showing an example of the annotation image with an annotation ID, which is temporarily stored into the projection control unit 112. FIG. 7A is a diagram showing timing in which the captured image with the image ID and the annotation image with the annotation ID are temporarily stored, and FIG. 7B is a diagram showing an example of images displayed on the display device 20.

Here, it is assumed that an annotation image of an annotation ID "b001" is written in by the operation unit 212 of the PC 2, and an annotation image of an annotation ID "b002" is written in by the operation unit 312 of the PC 3.

Figure 7B:
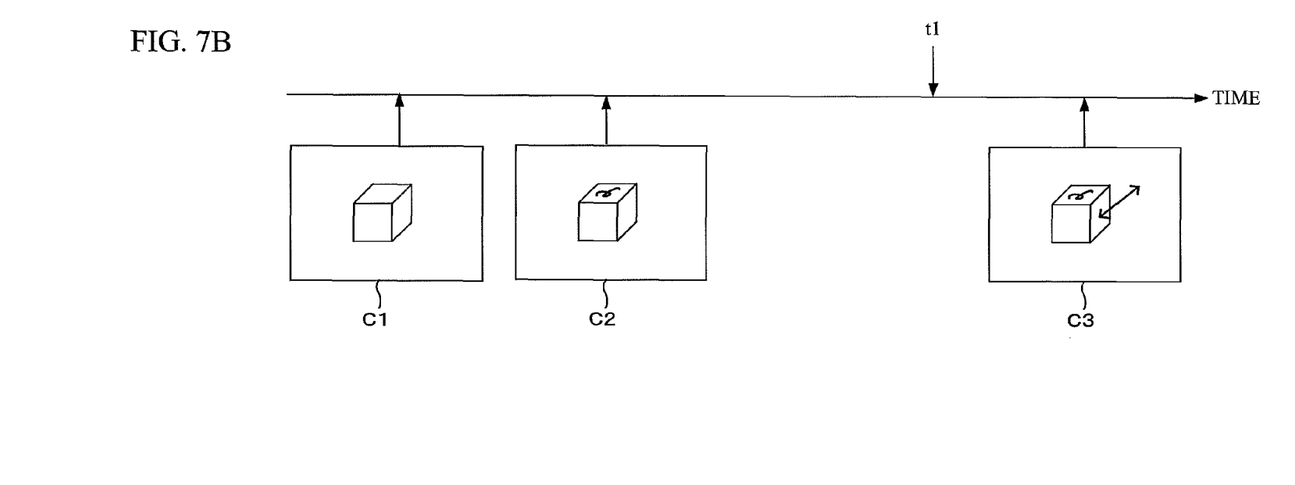
FIG. 7B is a diagram showing an example of images displayed on a display device 20.

As shown in FIGS. 7A and 7B, the timing in which the captured image with the image ID and the annotation image with the annotation ID are temporarily stored is different from timing in which the captured image and the annotation image are displayed on the display device 20. This is because the PC 1 is connected to the PCs 2 and 3 via the network 4.

It is assumed that, for example, the display device 20 connected to the PC 2 displays an image C2, and a user of the PC 2 instructs the PC 1 to store the image C2 at time t1 of FIG. 7. As shown in FIG. 7A, the PC 1 receives the storing command from the PC 2 at time t2. At this time, a capture image of an image ID "a003" has already been temporarily stored into the capture control unit 111.

Therefore, if the capture image and the annotation image temporarily stored into the capture control unit 111 and the projection control unit 112, respectively, are merely stored into the storage unit 114 in the case where the PC 1 has received the storing command from the PC 2, the capture image and the annotation image actually stored into the storage unit 114 are different from the capture image and the annotation image which the user of the PC 2 wants to store. That is, though the user of the PC 2 instructs the PC 1 to store the image C2, the capture image of the image ID "a003" and the annotation images of the annotation IDs "b001" and "b002" (i.e., these images correspond to an image C3) are stored into the storage unit 114.

However, in the present exemplary embodiment, the image ID and the annotation ID are included in the storing command in FIG. 4, and hence such a situation does not occur. That is, when storing the image C2 is instructed at the time t1 in FIG. 7B, the annotation image of the annotation ID "b001" and the capture image of the image ID "a002" which have been already acquired (i.e., these images correspond to the image C2) are stored into the storage unit 114.

Figure 8:
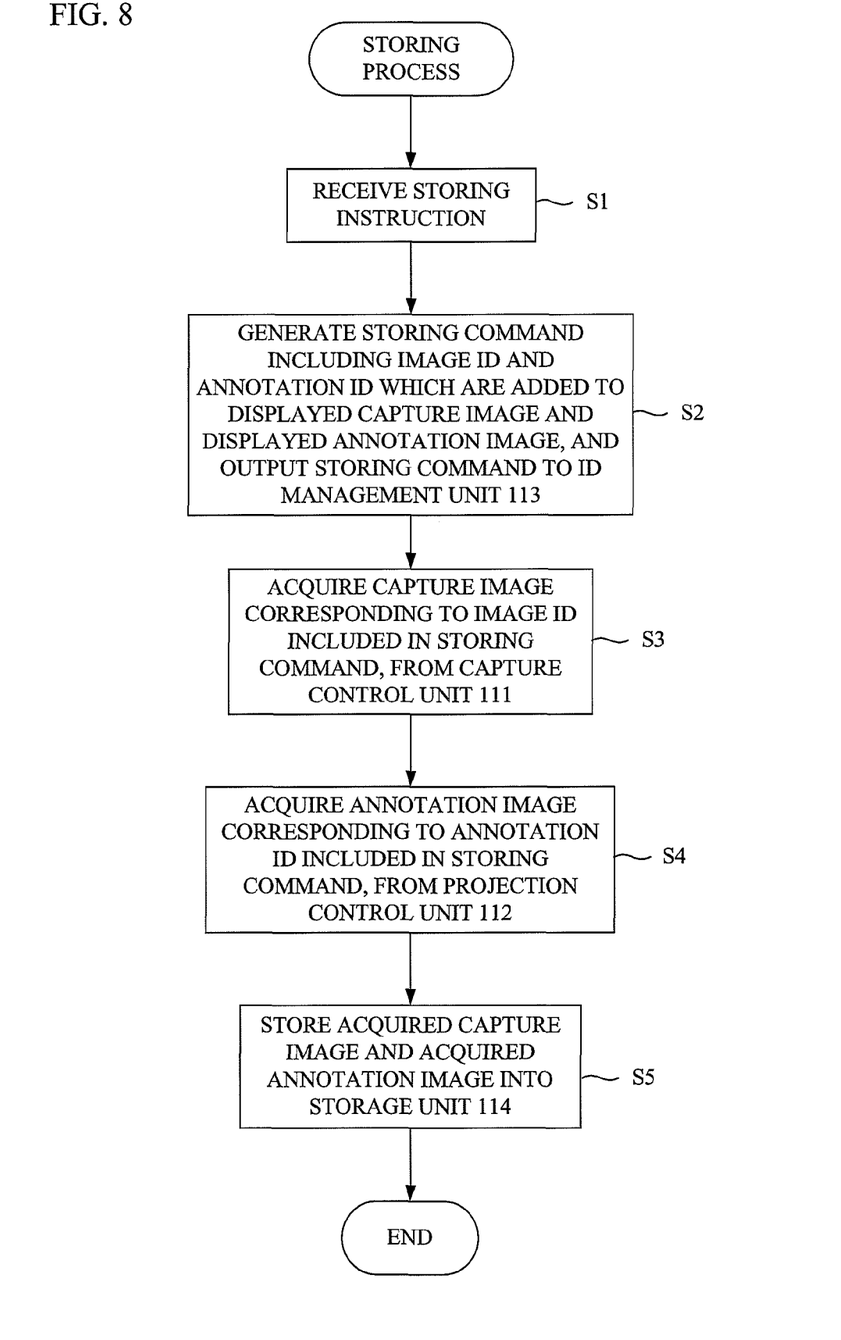
FIG. 8 is a flowchart showing a storing process executed with the remote indication system in FIG. 1.

FIG. 8 is a flowchart showing a storing process executed with the remote indication system in FIG. 1. Here, it is assumed that the storing instruction is input with the PC 2.

When the control unit 211 receives the storing instruction from the operation unit 212 (step S1), the control unit 211 generates the storing command including the image ID and the annotation ID which are added to the capture image and the annotation image displayed on the display device 20, and outputs the storing command to the ID management unit 113 (step S2).

The ID management unit 113 acquires the capture image corresponding to the image ID included in the storing command, from the capture control unit 111 (step S3). Further, the ID management unit 113 acquires the annotation image corresponding to the annotation ID included in the storing command, from the projection control unit 112 (step S4). Then, the ID management unit 113 stores the acquired capture image and the acquired annotation image into the storage unit 114 (step S5), and the present process is terminated.

Figure 9:
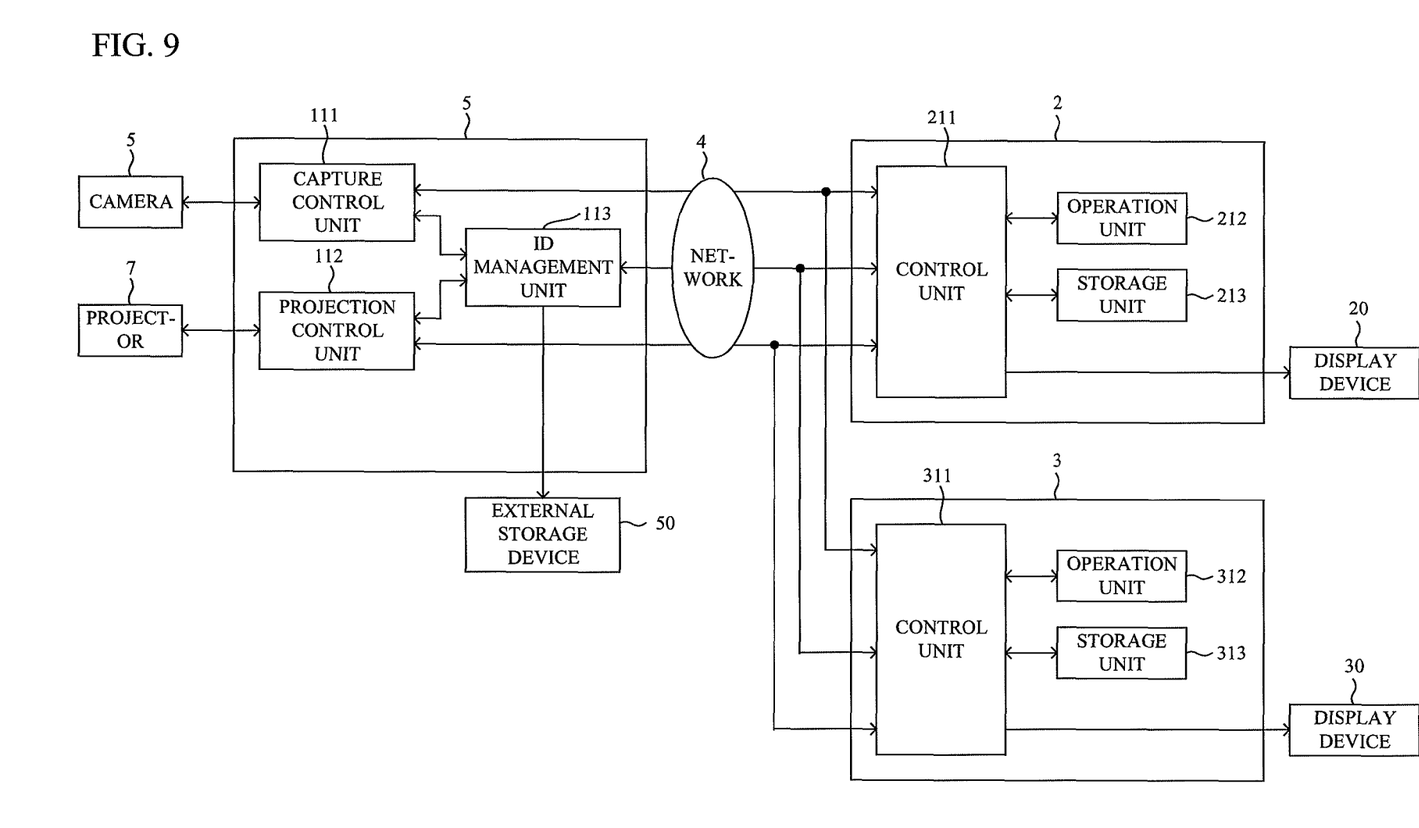
FIG. 9 is a functional block diagram of a first variation of the remote indication system in FIG. 1.

Although in the above-mentioned exemplary embodiment, the PC 1 includes the storage unit 114, an external storage device 50 may be connected to the ID management unit 113, as shown in FIG. 9. FIG. 9 shows functional blocks of a first variation of the remote indication system in FIG. 1.

Figure 10:
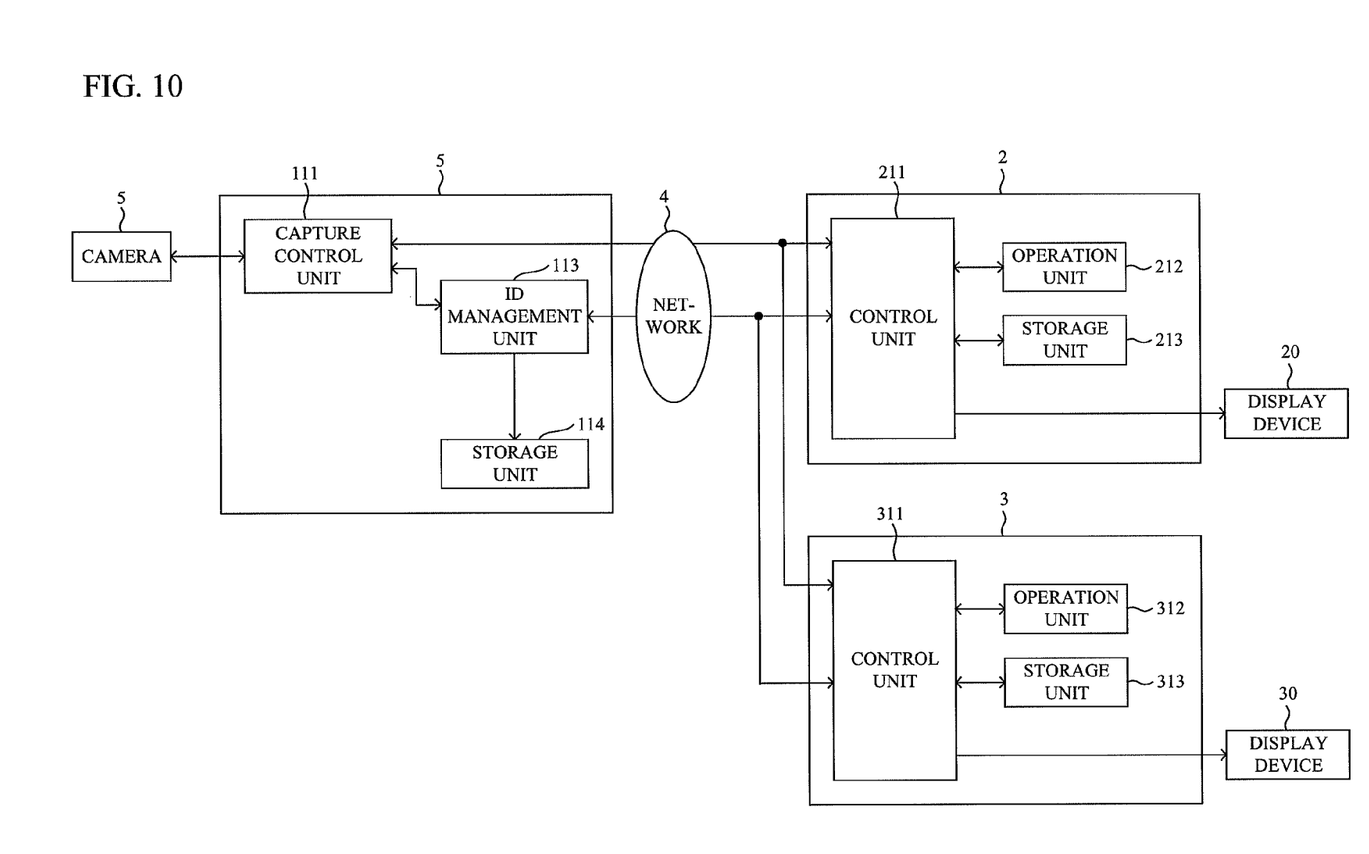
FIG. 10 is a functional block diagram of a second variation of the remote indication system in FIG. 1.

FIG. 10 is a functional block diagram of a second variation of the remote indication system in FIG. 1.

The remote indication system in FIG. 10 is different from the remote indication system in FIG. 3 in that there is not the projector 7 which projects the annotation image onto the object 8. Further, the PC 1 in FIG. 10 is different from the PC 1 in FIG. 3 in that there is not the projection control unit 112. The other elements of the remote indication system in FIG. 10 are the same as those of the remote indication system in FIG. 3.

Figure 11:
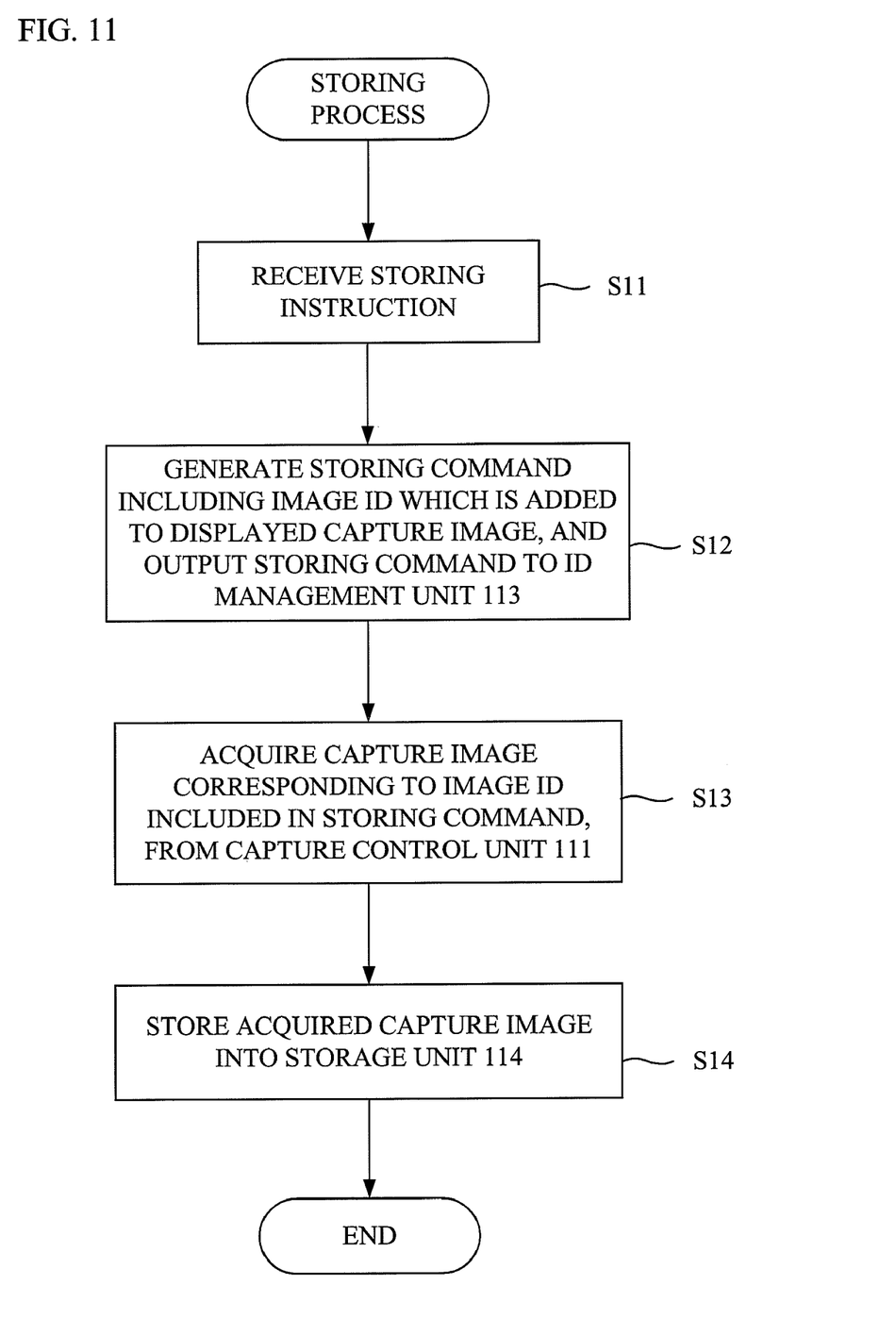
FIG. 11 is a flowchart showing a storing process executed with the remote indication system in FIG. 10.

FIG. 11 is a flowchart showing a storing process executed with the remote indication system in FIG. 10. Here, it is assumed that the storing instruction is input with the PC 2.

When the control unit 211 receives the storing instruction from the operation unit 212 (step S11), the control unit 211 generates the storing command including the image ID which is added to the capture image displayed on the display device 20, and outputs the storing command to the ID management unit 113 (step S12).

The ID management unit 113 acquires the capture image corresponding to the image ID included in the storing command, from the capture control unit 111 (step S13). Then, the ID management unit 113 stores the acquired capture image into the storage unit 114 (step S14), and the present process is terminated.

As described in detail above, according to the exemplary embodiment, the PC 1 includes the ID management unit 113 that manages the image ID to be added to the capture image from the camera 5, and the capture control unit 111 that adds the capture image to the image ID, temporarily stores the capture image to which the image ID is added, and transmits the capture image to which the image ID is added, to the PCs 2 and 3. When storing the image displayed on the display device 20 or 30 connected to the PC 2 or 3 is instructed, the ID management unit 113 receives the storing instruction including the image ID in relation to the displayed image, from the PC 2 or 3, acquires the capture image corresponding to the image ID included in the storing instruction from the capture control unit 111, and stores the acquired capture image into the storage unit 114.

Therefore, when storing the image displayed on the display device 20 or 30 is instructed, an original capture image corresponding to the displayed image is stored into the storage unit 114.

The PC 1 further includes the projection control unit 112 that adds the annotation ID to the annotation image input from the PC 2 or 3, returns the annotation ID to the PC 2 or 3, temporarily stores the annotation image to which the annotation ID is added, and transmits the annotation image to which the annotation ID is added, to the projector 7. The ID management unit 113 manages the annotation ID. When storing the image displayed on the display device 20 or 30 is instructed, the ID management unit 113 receives the storing instruction including the image ID and the annotation ID in relation to the displayed image, from the PC 2 or 3, acquires the capture image corresponding to the image ID included in the storing instruction from the capture control unit 111 and the annotation image corresponding to the annotation ID included in the storing instruction from the projection control unit 112, and stores the acquired capture image and the acquired annotation image into the storage unit 114.

Therefore, when storing the image displayed on the display device 20 or 30 is instructed, an original capture image and an original annotation image corresponding to the displayed image are stored into the storage unit 114.

In the above-mentioned exemplary embodiment, the image ID and the annotation ID may be time stamps representing time. In this case, it is necessary to match time settings in the PCs 1 to 3 accurately.

A recording medium on which the software program for realizing the functions of the PC 1 is recorded may be supplied to the PC 1, and the CPU 101 may read and execute the program recorded on the recording medium. In this manner, the same effects as those of the above-described exemplary embodiment can be achieved. The recording medium for providing the program may be a CD-ROM, a DVD, or a SD card, for example.

Alternatively, the CPU 101 may execute a software program for realizing the functions of the PC 1, so as to achieve the same effects as those of the above-described exemplary embodiment.

It should be noted that the present invention is not limited to those exemplary embodiments, and various modifications may be made to them without departing from the scope of the invention.

What is claimed is:

1. An information processing apparatus comprising:
a management portion that manages an image identifier (ID) to be added to a capture image from a capture device; and
a first control portion that adds the image ID to the capture image, temporarily stores the capture image to which the image ID is added, and transmits the capture image to which the image ID is added, to a remote terminal,
wherein when storing an image displayed on a display device which is connected to the remote device is instructed, the management portion receives a storing instruction including the image ID associated with the displayed image from the remote terminal, acquires the capture image corresponding to the image ID included in the storing instruction from the first control portion, and stores the acquired capture image into a storage, and
wherein the image ID is not saved as an image along with the capture image.

2. The information processing apparatus according to claim 1, further comprising a second control portion that adds an annotation identifier (ID) to an annotation image input from the remote terminal, returns the annotation ID to the remote terminal, temporarily stores the annotation image to which the annotation ID is added, and transmits the annotation image to which the annotation ID is added, to a projection device,
wherein the management portion manages the annotation ID,
when storing the image displayed on the display device is instructed, the management portion receives the storing instruction including the image ID and the annotation ID associated with the displayed image from the remote terminal, acquires the capture image corresponding to the image ID included in the storing instruction from the first control portion and the annotation image corresponding to the annotation ID included in the storing instruction from the second control portion, and stores the acquired capture image and the acquired annotation image into the storage, and
wherein the annotation ID is not saved as an image along with the capture image.

3. The information processing apparatus according to claim 2, wherein the image ID uniquely identifies the capture image, and the annotation ID uniquely identifies the annotation image.

4. The information processing apparatus according to claim 1, wherein the image ID uniquely identifies the capture image.

5. A remote indication system comprising:
an information processing apparatus including:
a management portion that manages an image identifier (ID) to be added to a capture image from a capture device; and
a first control portion that adds the image ID to the capture image, temporarily stores the capture image to which the image ID is added, and transmits the capture image to which the image ID is added, to a remote terminal; and
the remote terminal including a remote control portion that, when storing an image displayed on a display device which is connected to the remote device is instructed, generates a storing instruction including the image ID in relation to the displayed image, and transmits the storing instruction to the management portion,
wherein when storing the image displayed on the display device which is connected to the remote device is instructed, the management portion receives the storing instruction including the image ID associated with the displayed image from the remote terminal, acquires the capture image corresponding to the image ID included in the storing instruction from the first control portion, and stores the acquired capture image into a storage.

6. The remote indication system according to claim 5, further comprising a second control portion that adds an annotation identifier (ID) to an annotation image input from the remote terminal, returns the annotation ID to the remote terminal, temporarily stores the annotation image to which the annotation ID is added, and transmits the annotation image to which the annotation ID is added, to a projection device,
wherein the management portion manages the annotation ID, and
when storing the image displayed on the display device is instructed, the management portion receives the storing instruction including the image ID and the annotation ID associated with the displayed image from the remote terminal, acquires the capture image corresponding to the image ID included in the storing instruction from the first control portion and the annotation image corresponding to the annotation ID included in the storing instruction from the second control portion, and stores the acquired capture image and the acquired annotation image into the storage.

7. A non-transitory computer readable medium causing a computer to execute a process, the process comprising:
managing an image ID to be added to a capture image from a capture device;
adding the image ID to the capture image;
temporarily storing the capture image to which the image ID is added; and
transmitting the capture image to which the image ID is added, to a remote terminal,
wherein when storing an image displayed on a display device which is connected to the remote device is instructed, a storing instruction including the image ID in associated with the displayed image is received from the remote terminal, and the capture image corresponding to the image ID included in the storing instruction is acquired and stored into a storage, and
wherein the image ID is not saved as an image along with the capture image.

* * * * *